United States Patent
Zhang et al.

(10) Patent No.: US 9,453,622 B2
(45) Date of Patent: Sep. 27, 2016

(54) LENS AND LED MODULE HAVING THE SAME

(71) Applicant: Wanjiong Lin, Ningbo (CN)

(72) Inventors: Fawei Zhang, Ningbo (CN); Zuping He, Ningbo (CN); Wanjiong Lin, Ningbo (CN)

(73) Assignee: Self Electronics Co., Ltd., Ningbo (CN)

( * ) Notice: Subject to any disclaimer, the term of this patent is extended or adjusted under 35 U.S.C. 154(b) by 89 days.

(21) Appl. No.: 14/518,500

(22) Filed: Oct. 20, 2014

(65) Prior Publication Data

US 2015/0124460 A1   May 7, 2015

(30) Foreign Application Priority Data

Nov. 5, 2013  (CN) .......................... 2013 1 0552878

(51) Int. Cl.

| | |
|---|---|
| *F21V 5/04* | (2006.01) |
| *F21K 99/00* | (2016.01) |
| *G02B 19/00* | (2006.01) |
| *F21V 13/04* | (2006.01) |
| *F21Y 101/00* | (2016.01) |

(52) U.S. Cl.
CPC ................. *F21K 9/50* (2013.01); *F21V 13/04* (2013.01); *G02B 19/0028* (2013.01); *G02B 19/0061* (2013.01); *F21V 5/04* (2013.01); *F21Y 2101/00* (2013.01)

(58) Field of Classification Search
CPC .......... F21V 5/04; F21V 5/048; F21V 13/04; F21V 5/046; F21V 5/08; F21V 5/00; F21K 9/50; F21K 9/00; G02B 19/0028; G02B 19/0061; F21Y 2101/00; F21Y 2115/10
See application file for complete search history.

(56) References Cited

U.S. PATENT DOCUMENTS

| | | | |
|---|---|---|---|
| 8,704,256 B2* | 4/2014 | Sekii ..................... | F21V 5/04 257/98 |
| 8,733,981 B2* | 5/2014 | Jiang ..................... | F21V 5/04 362/311.01 |
| 9,267,667 B2* | 2/2016 | Jiang ..................... | F21V 5/04 |
| 2005/0265041 A1* | 12/2005 | Wimbert ............... | F21S 48/215 362/545 |
| 2013/0240928 A1* | 9/2013 | Jang ...................... | F21V 5/04 257/98 |
| 2014/0063816 A1* | 3/2014 | Seki ...................... | F21V 5/04 362/309 |

* cited by examiner

*Primary Examiner* — Bao Q Truong
(74) *Attorney, Agent, or Firm* — Wang Law Firm, Inc.

(57) ABSTRACT

A lens includes an optical axis, a light source recess arranged through the optical axis, a reflection surface crossing through the optical axis, and a critical reflection surface which is arranged in a spaced relationship with the optical axis. The critical reflection surface is arranged between the light source recess and the reflection surface and receives the light from the light source recess and the reflection surface and reflects the light from the light source recess and the reflection surface towards the reflection surface. The emission light of the lens is light emitted forward of the light emitting surface which is reflected via the reflection surface and the critical reflection surface. Therefore, people cannot receive directly light emitted forward of the LED after it cross through the lens. In result, high luminance light from the LED is prevented from ripping into eyes, which achieve the aim of anti-glare.

8 Claims, 3 Drawing Sheets

LENS AND LED MODULE HAVING THE SAME

RELATED APPLICATION

This application claims benefit of the Chinese Application, CN201310552878.1, filed on Nov. 5, 2013, the entire specification of which is hereby incorporated by reference.

BACKGROUND

1. Technical Field

The disclosure relates to a lighting devices, and more particularly to a lens and a LED module having the same.

2. Description of the Related Art

For years, people have used traditional incandescent or fluorescence lighting apparatus in order to address their interior lighting concerns. However, such lighting apparatus presents a number of drawbacks. For example, the popular halogen apparatus presents the following drawbacks, such as relatively high power consumption, inefficiency of light dispersion due to the placement of its metal shield in the line sight of the halogen bulb, and its limited effectiveness in preventing glare from the halogen bulb.

Recently, a number of LED lighting apparatuses have been designed to replace the halogen apparatus, as well as other traditional incandescent or fluorescence lighting apparatuses. As idea of humanized design for illumination is looked so deeply into the human mind, the illumination design should bring into better effect in home lighting and commercial lighting so as to satisfy the requirements of physiology and psychology of people in all of aspects. As well known, glare may be formed since the LED lighting apparatuses have feature of high luminance. Therefore, it is an important standard for a lamp to reduce glare, and anti-glare functions also is a critical factor for quality of a lamp.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
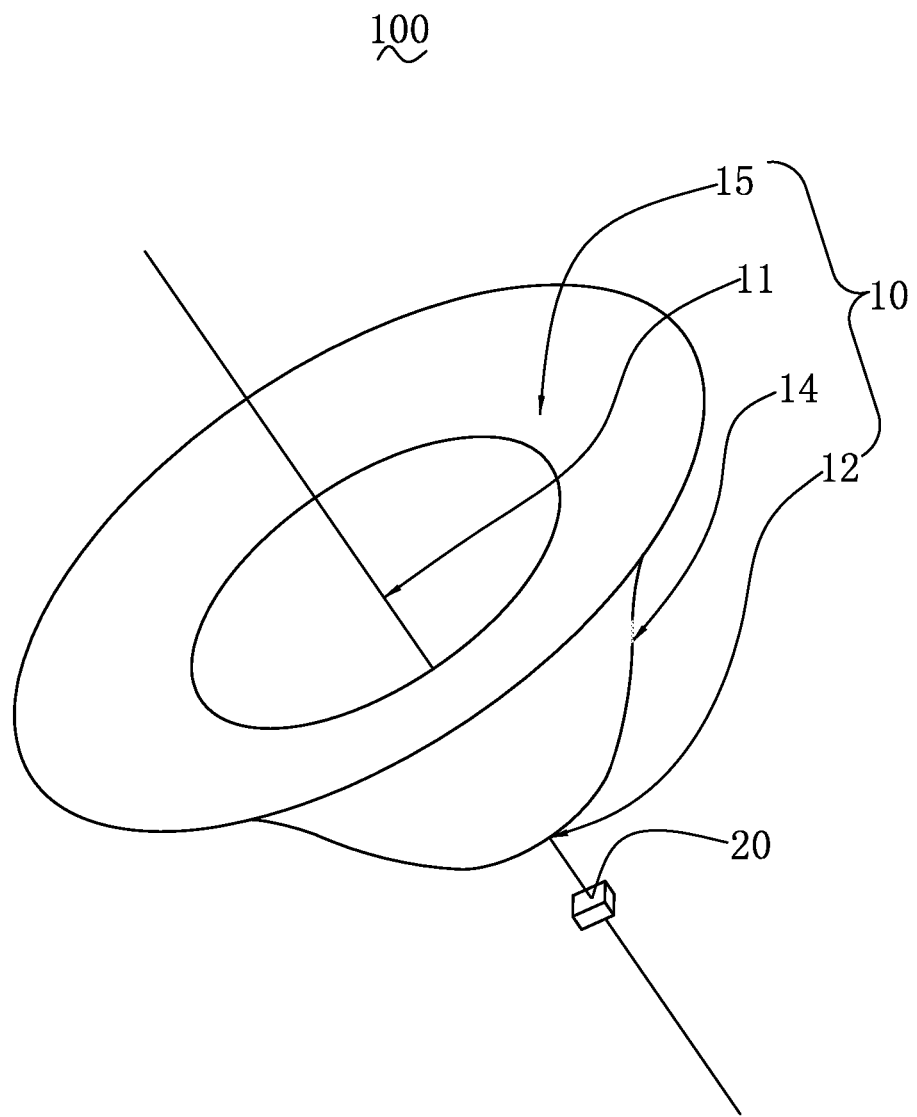
FIG. 1 is an explored view of an LED module according to an embodiment.
Figure 2A:
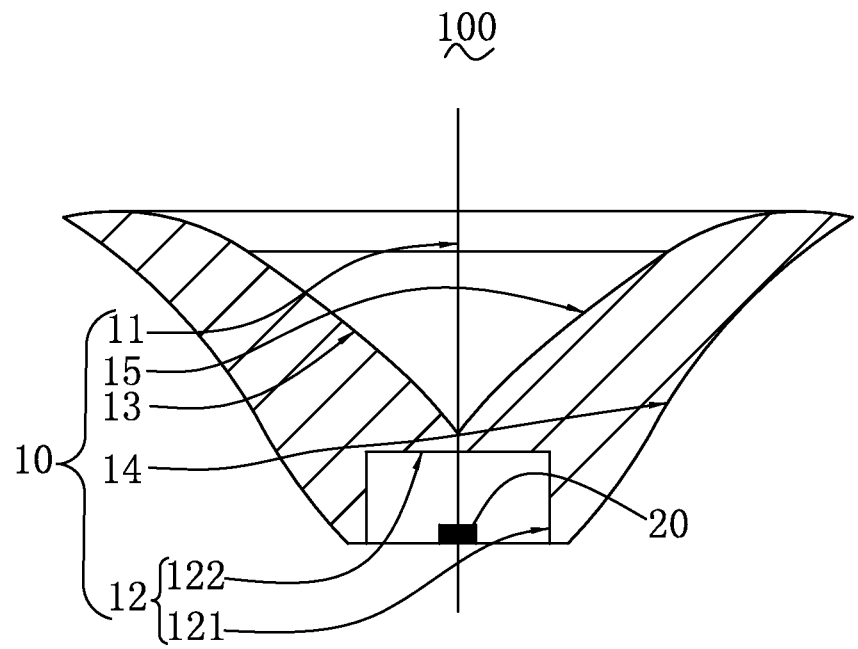
FIG. 2A and FIG. 2B are schematic views of an LED of the LED module of FIG. 1 which is located in different position.
Figure 2B:
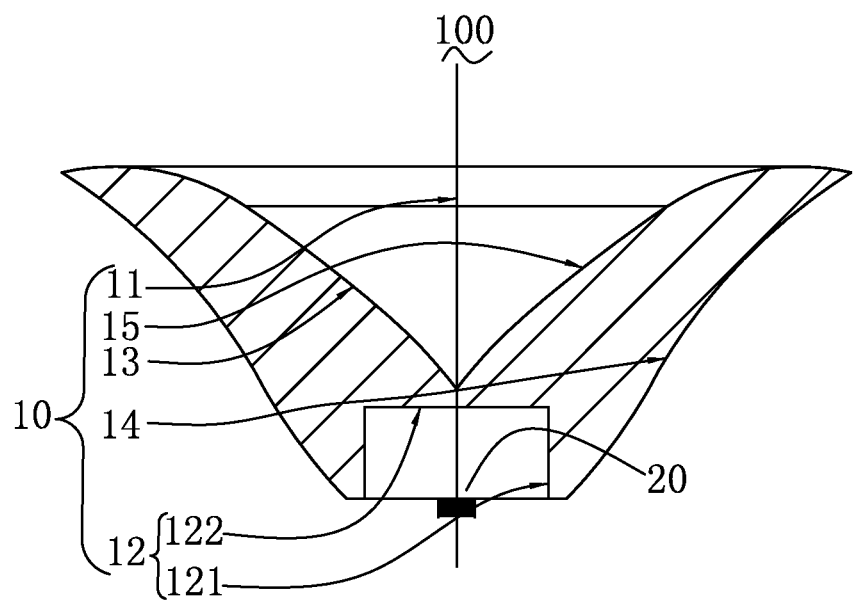
Figure 3:
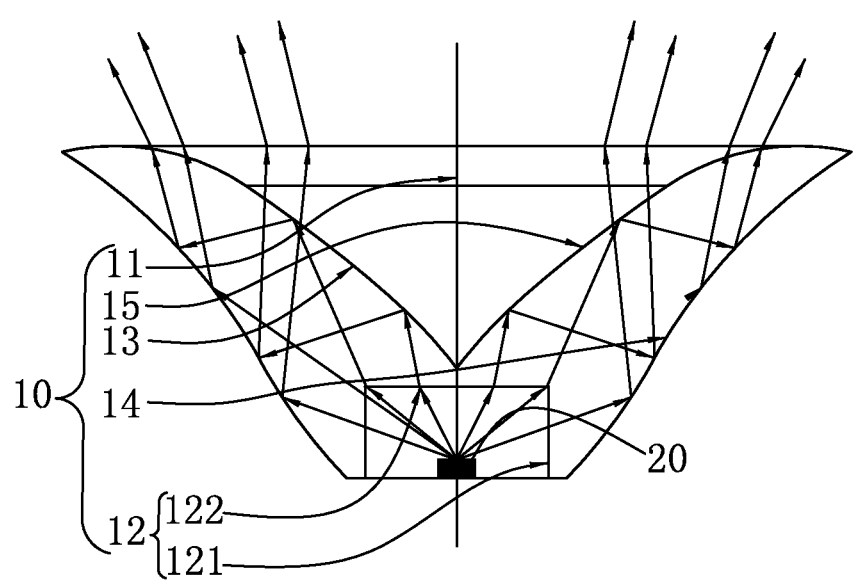
FIG. 3 is light path view of the LED module of FIG. 1.

Referring to FIG. 1 to FIG. 3, an LED module 100 is shown. The LED module 100 includes a lens 10 and a LED 20 housed in the lens 10. The lens 10 includes an optical axis 11, a light source recess 12 arranged through the optical axis 11, a reflection surface 13 crossing through the optical axis 11, and a critical reflection surface 14 arranged in a spaced relationship with the optical axis 11.

As same as a traditional lens, the optical axis 11 is a universal feature for all of lens and used to dispose the light source, namely the LED 20. Moreover, the optical axis 11 is a guide for optic design.

The light source recess 12 is configured for mounting the LED 20 or other traditional light source. In the present embodiment, the light source is the LED 20. When dimension scale between the lens 10 and the light source is as same as that between the lens 10 and the LED 20, the light source may be other traditional light source, such as incandescent or fluorescence lighting apparatuses, and so on. As shown in FIG. 2A and FIG. 2B, the LED 20 may be mounted into the light source recess 12 or at outer side of the light source recess 12. When the LED 20 is disposed into the light source recess 12, a bottom side of the LED 12 is flush with an end of the light source recess 12 for sufficiently taking advantage of the light emitted forward of the LED 12 and ease to assemble the lens 11 and the LED 20. When the LED 20 is mounted at outer side of the light source recess 112, a light emitting side of the LED 12 is flush with the end of the light source recess 12 for sufficiently taking advantage of the light emitted forward of the LED 20. In the present embodiment, the bottom side of the LED 20 is flush with the end of the light source recess 12. The light source recess 12 has a central axis which overlaps with the optical axis 111 of the lens 11 for ease to optic design. The light source recess 12 includes a side wall 121 and a top wall 122. The light emitting forward of the LED 20

The reflection surface 13 is face to the top wall 122 of the light source recess 12. The optical axis 11 cross through the reflection surface 13 so that the reflection surface 13 can receive the light emitted from the top wall 122 and reflect it towards the critical reflection surface 14. Referring to FIG. 2, the LED 20 may be simplified into a point light source since the dimension of the LED 20 is far less than that of the lens 10. The light path emitted from the top wall 122 has a shape of fan in a section view along the optical axis 11. That is to say, each of the light paths emitted from the top wall 122 has a different angle with the optical axis 11 respectively. Therefore, in order to reflect the light emitted from the top wall 122 into the critical reflection surface 14, tangent line of any point of the reflection surface 13 in the section view along the optical axis 11 have different angle with the optical axis 11 respectively.

The critical reflection surface 14 is configured for reflecting all of light received from the reflection surface 13 and the side wall 121. The critical reflection surface 14 is arranged between the light source recess 12 and the reflection surface 13 and is formed a inclined surface like a mortar. In a section view along the optical axis 11, an end of outline of the critical reflection surface 14 is connected to the reflection surface 13, and the other is connected to the free end of the side wall 121 so as to receive all of light emitted forward to the reflection surface 13 and the side wall 121 of the light source recess 12. The critical reflection surface 14 is designed to have an angle capable of reflecting the received light.

The lens 10 further includes a light emitting surface 15. The light emitting surface 15 and the reflection surface 13 are one and the same. The light emitting surface 15 is located in outer side of the lens 10. The reflection surface 13 is located in inner side of the lens 10. In order to control beam width of the light emitted forward of the light emitting surface 15 so as to form controlled illumination pattern on the illuminated area, a plurality of convex lenses are formed in the radial direction and in the circumferential direction around the LED 20 which is provided at the center thereof. Each of the convex lenses has a radius R and a height h and a lateral dimensional L. The radius R, the height h, and the lateral dimensional L are used to design according to beam wide of incident light. According to embodiments of the present invention, the convex lenses can be made to provide different beam widths by varying the parameters such as R, h, and L. For example, in one embodiment, a configuration with R=3.0 mm, h=0.1 mm, L=1.33 mm is used for a narrow beam having a beam width of about 12-17 degrees; R=2.0 mm, h=0.55 mm, and L=3.0 mm is used for a wide beam having a beam width of about 25-30 degrees.

The LED 20 is a semiconductor light source and transforms power into light. The LED 20 presents many advantages over traditional light sources including lower energy consumption, longer lifetime, improved physical robustness, smaller size, and faster switching. A center of the LED 20 is arranged on the optical axis 11 of the lens 10 for ease to optic design.

In use, the emission light of the lens 10 is light emitted forward of the light emitting surface 15 which is reflected via the reflection surface 13 and the critical reflection surface 15. Therefore, people cannot receive directly light emitted forward of the LED 20 after it cross through the lens 10. In result, high luminance light from the LED 20 is prevented from ripping into eyes, which achieve the aim of anti-glare.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens comprising:
   an optical axis;
   a light source recess arranged through the optical axis;
   a reflection surface crossing through the optical axis;
   a light emitting surface; and
   a critical reflection surface which is arranged in a spaced relationship with the optical axis, wherein the reflection surface receives the light from the light source recess and reflects the light from the light source recess onto the critical reflection surface, the critical reflection surface is arranged between the light source recess and the reflection surface and receives the light from the light source recess and the reflection surface and reflects the light from the light source recess and the reflection surface towards the reflection surface, the light emitting surface has same structure with the reflection surface, the light reflected from the critical reflection surface is emitted via the light emitting surface.

2. The lens of claim 1, wherein the lens is a solid of revolution obtained by rotating a plane curve around the optical axis.

3. The lens of claim 1, wherein the reflection surface interconnects with the critical reflection surface.

4. The lens of claim 1, wherein the light emitting surface is located in outer side of the lens, the reflection surface is located in inner side of the lens.

5. The lens of claim 1, wherein tangent line of any point of the reflection surface in the section view along the optical axis have different angle with the optical axis respectively.

6. A LED module, comprising:
   an LED; and
   a lens according to one lens of claim 1, the lens mounted on the light path of the LED.

7. The LED module of claim 6, wherein the light source recess has a center axis along axial direction thereof which overlaps with the optical, a bottom side of the LED is flush with the end of the light source recess.

8. The LED module of claim 6, wherein the light source recess has a center axis along axial direction thereof which overlaps with the optical axis, the LED has a light emitting side which is flush with the end of the light source recess.

* * * * *